United States Patent
Toyoizumi et al.

(10) Patent No.: US 11,292,402 B2
(45) Date of Patent: Apr. 5, 2022

(54) DETERIORATION REGENERATION SYSTEM AND DETERIORATION REGENERATION METHOD

(71) Applicant: Yazaki Corporation, Tokyo (JP)

(72) Inventors: Jun Toyoizumi, Makinohara (JP); Kenzo Tanaka, Makinohara (JP); Yoshitaka Ito, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 265 days.

(21) Appl. No.: 16/589,780

(22) Filed: Oct. 1, 2019

(65) Prior Publication Data

US 2020/0130614 A1    Apr. 30, 2020

(30) Foreign Application Priority Data

Oct. 30, 2018  (JP) .............................. JP2018-203490

(51) Int. Cl.
B60R 16/02    (2006.01)

(52) U.S. Cl.
CPC ................ B60R 16/0215 (2013.01)

(58) Field of Classification Search
CPC ................... B60R 16/0215; H01H 1/0015
See application file for complete search history.

(56) References Cited

U.S. PATENT DOCUMENTS

| 4,893,109 A | * | 1/1990 | Vrabel | B60R 21/0176 180/271 |
| 7,949,448 B2 | * | 5/2011 | You | B60R 21/0173 701/45 |
| 2015/0043881 A1 | | 2/2015 | Suzuki | |
| 2018/0029554 A1 | * | 2/2018 | Schumacher | B60R 21/0173 |

FOREIGN PATENT DOCUMENTS

| CN | 104345799 A | 2/2015 |
| JP | 2009-46111 A | 3/2009 |
| JP | 5459713 B2 | 4/2014 |
| JP | 2016-218775 A | 12/2016 |

* cited by examiner

*Primary Examiner* — Natalie Huls
*Assistant Examiner* — Cynthia L. Davis
(74) *Attorney, Agent, or Firm* — Sughrue Mion, PLLC

(57) ABSTRACT

A deterioration regeneration system includes a pre-post regeneration determination part configured to determine whether or not to execute, with respect to an electric contact to which an electrical or mechanical first external action is applied during an operation of a later-stage device, a deterioration regeneration process of regenerating a connection performance that has been deteriorated due to an increase in a contact resistance of the electric contact, and a deterioration regeneration part configured to execute a process of removing a foreign object present at the electric contact by applying a second external action to the electric contact, as the deterioration regeneration process, according to the determined result from the pre-post regeneration determination part, the second external action being of the same kind as the first external action and larger than the first external action.

7 Claims, 5 Drawing Sheets

DETERIORATION REGENERATION SYSTEM AND DETERIORATION REGENERATION METHOD

TECHNICAL FIELD

The present invention relates to a deterioration regeneration system and a deterioration regeneration method for regenerating a deteriorated connection performance of an electric contact.

BACKGROUND

It is known that various electrical components mounted on a vehicle will deteriorate in their performances due to a long-term exposure to a severe environment such as traveling of the vehicle. Technologies to address such performance deterioration have conventionally been proposed.

For example, among the performance deterioration as mentioned above, a technology for detecting deterioration in an insulation performance at various locations is known (for example, refer to Patent Document 1 mentioned below). In the technology described in this Patent Document 1, number of revolutions of an electric motor mounted on a vehicle is reduced when the deterioration in the insulation performance is detected.

PRIOR ART DOCUMENT

Patent Document

Patent Document 1: JP 5459713 B

SUMMARY OF THE INVENTION

Problem to be Solved

Regarding the above-described performance deterioration, it is known that a contact resistance of an electric contact, e.g., a connecting part between terminals of connectors fitted to each other or a contacting part of a relay, is increased over time, causing deterioration in a connection performance. As a matter of fact, however, a technique for addressing such deterioration in the connection performance of the electric contact has not yet been sufficiently investigated. Further, though the deterioration in the connection performance needs to be addressed, a large-scaled disassembling inspection and such would put a heavy burden on a user. Hence, there is a demand for a technique that can easily address the deterioration in the connection performance of the electric contact.

In view of the above-described problem, an object of the present invention is to provide a deterioration regeneration system and a deterioration regeneration method that can easily address deterioration in a connection performance of an electric contact.

Solution to Problem

In order to achieve the above-described object, the present invention provides, in one aspect, a deterioration regeneration system including a determination part configured to determine whether or not to execute, with respect to an electric contact to which an electrical or mechanical first external action is applied during an operation of a later-stage device, a deterioration regeneration process for regenerating a connection performance that has been deteriorated due to an increase in a contact resistance of the electric contact, and a deterioration regeneration part configured to execute a process of removing a foreign object present at the electric contact by applying a second external action to the electric contact, as the deterioration regeneration process, according to the determined result obtained from the determination part, the second external action being of the same kind as the first external action and larger than the first external action.

Further, the present invention provides, in another aspect, a deterioration regeneration method including a determination step of determining whether or not to execute, with respect to an electric contact to which an electrical or mechanical first external action is applied during an operation of a later-stage device, a deterioration regeneration process of regenerating a connection performance that has been deteriorated due to an increase in a contact resistance of the electric contact, and a deterioration regeneration step of executing a process of removing a foreign object present at the electric contact by applying a second external action to the electric contact, as the deterioration regeneration process, according to the determined result obtained from the determination step, the second external action being of the same kind as the first external action and larger than the first external action.

Advantageous Effect of the Invention

According to the deterioration regeneration system and the deterioration regeneration method of the present invention, it is capable of appropriately executing the deterioration regeneration process of removing the foreign object present at the electric contact and causing an increase in the contact resistance by applying the second external action. At this time, the second external action to be applied to the electric contact in the deterioration regeneration process is of the same kind as and larger than the first external action to be applied to the electric contact during the operation of the later-stage device. Such second external action can be achieved easily and simply by utilizing the existing electrical or mechanical mechanism provided around the electric contact and temporarily increasing its operation level and such. Consequently, according to the deterioration regeneration system and the deterioration regeneration method of the present invention, the deterioration in the connection performance of the electric contact can be addressed easily and simply without needing to perform a large-scaled disassembling inspection and such.

DETAILED DESCRIPTION OF THE EXEMPLARY EMBODIMENTS

The following will explain a first embodiment of the present invention. Firstly, the first embodiment will be explained.

Figure 1:
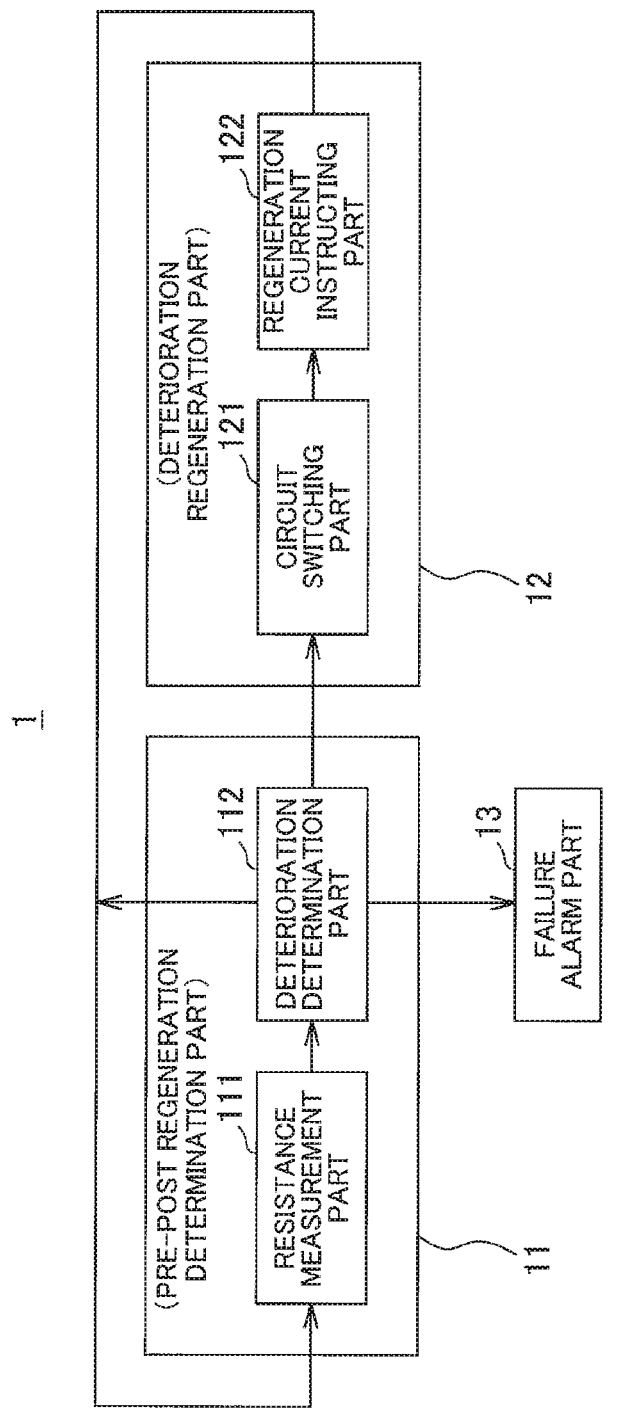
FIG. 1 is a block diagram illustrating a deterioration regeneration system according to a first embodiment of the present invention.

FIG. 1 is a block diagram illustrating a deterioration regeneration system according to the first embodiment of the present invention.

A deterioration regeneration system 1 of this embodiment is a system built in an ECU (Engine Control Unit) as a control device of a vehicle, and as will be described later, it is configured to regenerate deterioration of an electric contact between terminals of connectors connecting the ECU and an airbag device.

The deterioration regeneration system 1 includes a pre-and-post regeneration determination part 11, a deterioration regeneration part 12 and a failure alarm part 13. The pre-and-post regeneration determination part 11 includes a resistance measurement part 111 and a deterioration determination part 112. The deterioration regeneration part 12 includes a circuit switching part 121 and a regeneration current instructing part 122.

The pre-and-post regeneration determination part 11 makes the following determinations before and after the deterioration regeneration process with respect to the electric contact between the terminals of the connectors. First of all, the term "deterioration regeneration process" as used herein is a process for regenerating the connection performance that has been deteriorated due to an increase in a contact resistance of the electric contact over time, by reducing the contact resistance of the electric contact. The pre-and-post regeneration determination part 11 determines, before the deterioration regeneration process, whether or not to execute the deterioration regeneration process based on the contact resistance, and determines, after the deterioration regeneration process, whether or not the deteriorated state is still continuing based on the contact resistance obtained after the process.

The resistance measurement part 111 at this pre-and-post regeneration determination part 11 measures the contact resistance of the above-described electric contact based on a dark current flowing through the electric contact. The deterioration determination part 112 determines, before the deterioration regeneration process, whether or not the deterioration regeneration process needs to be executed by comparing the measured result from the resistance measurement part 111 with a predetermined threshold value. This determined result obtained before the deterioration regeneration process is sent to the deterioration regeneration part 12. After the deterioration regeneration process, the deterioration determination part 112 determines whether or not the deteriorated state is continuing at the electric contact by comparing the measured result obtained at the resistance measurement part 111 with a predetermined threshold value. This determined result obtained after the deterioration regeneration process is sent to the failure alarm part 13.

According to the determined result at the deterioration determination part 112, the deterioration regeneration part 12 executes the following process as the deterioration regeneration process. That is, the deterioration regeneration part 12 executes the process of removing a foreign object present at the electric contact and causing an increase in the contact resistance, by temporarily applying a second external action to the electric contact, the second external action being of the same kind as and larger than an electrical first external action to be applied during a normal operation of an airbag device as a later-stage (downstream) device of the electric contact.

Figure 2:
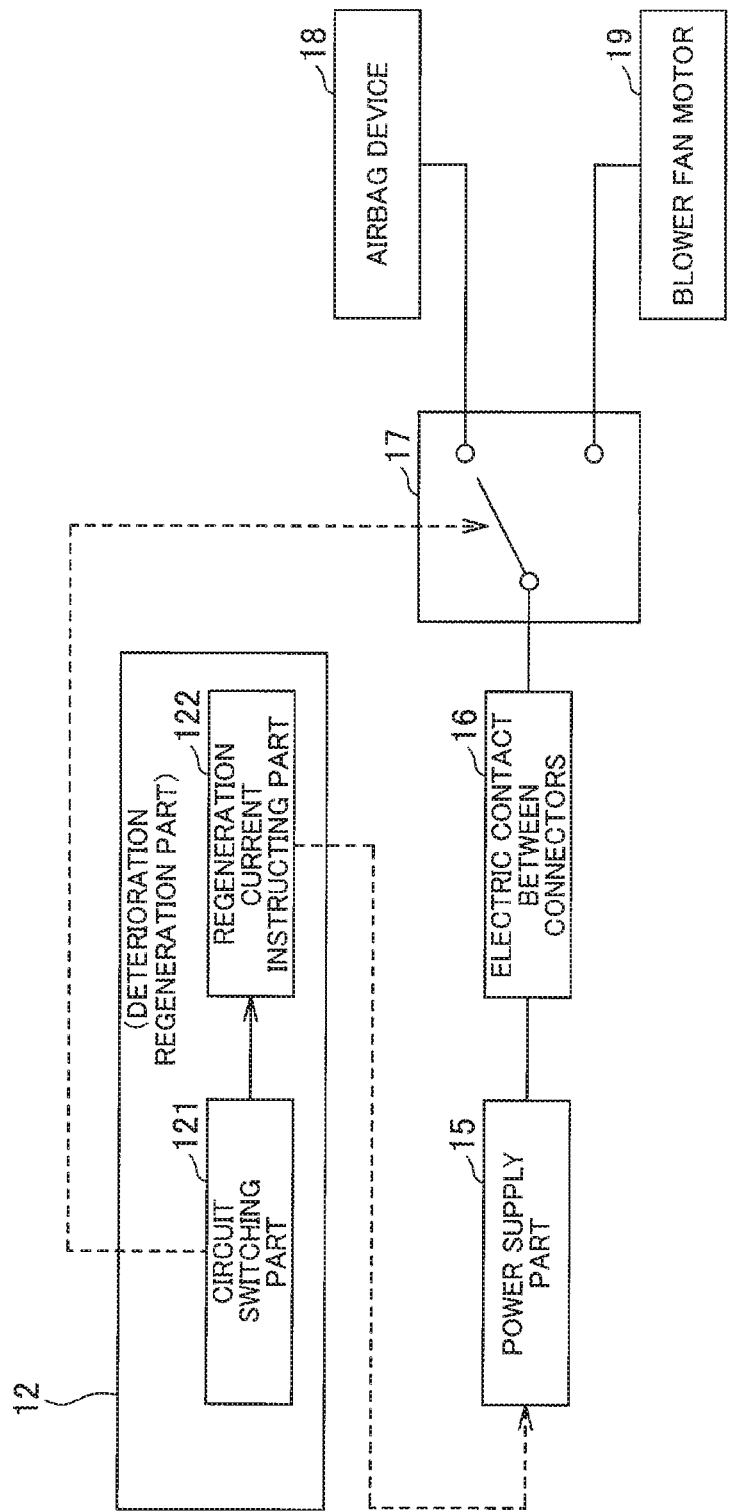
FIG. 2 is a schematic diagram illustrating a deterioration regeneration process executed in a deterioration regeneration part shown in FIG. 1.

FIG. 2 is a schematic diagram illustrating the deterioration regeneration process executed in the deterioration regeneration part shown in FIG. 1.

In this embodiment, the deterioration regeneration part 12 executes the deterioration regeneration process by providing instructions to a power supply part 15 mounted on the vehicle and a switching circuit 17 as described below. The switching circuit 17 is disposed between an airbag device 18 and an electric contact 16 constituted of connection between connectors or terminals of the connectors for connecting the ECU not shown with the airbag device 18. This switching circuit 17 is connected so as to allow the electric contact 16 to be switchably connected to the airbag 18 at a normal state and to a blower fan motor 19.

The circuit switching part 121 of the deterioration regeneration part 12 provides an instruction to the switching circuit 17 to switch a connection destination of the electric contact 16 from the airbag 18 at a normal state to the blower fan motor 19. This blower fan motor 19 is a device that allows a regeneration current as the second external action to flow through the electric contact 16, the regeneration current being larger than a current as the first external action that flows through the electric contact 16 during the operation of the airbag device 18.

After the switching by the switching circuit 17, the regeneration current instructing part 122 in the deterioration regeneration part 12 provides an instruction to the power supply part 15 to make the regeneration current to flow from this power supply part 15 through the electric contact 16 to the blower fan motor 19. In the deterioration regeneration process of this embodiment, this regeneration current removes an foreign object such as an insulating oxide coating formed over time at the electric contact 16.

After such deterioration regeneration process, the pre-and-post regeneration determination part 11 shown in FIG. 1 determines whether or not the deteriorated state is still continuing at the electric contact 16 after the deterioration regeneration process, as described above. Then, in response to this determined result, the failure alarm part 13 executes the following process.

When it was determined that the deteriorated state is still continuing after the deterioration regeneration process, the failure alarm part 13 notifies that there is a failure occurring at the electric contact 16.

Although not specified herein, the form of the notification by this failure alarm part 13 may include a notification by generation of an alarm sound or lighting of a LED. The form the notification is not limited to a sound or a light and may also include, for example, displaying of a message indicative of the failure on a display screen of a car navigation system and such, and notifying with voice from a navigation system. Further, other than just notifying the failure, a location of the electric contact 16 at which the failure has occurred may be notified together.

Figure 3:
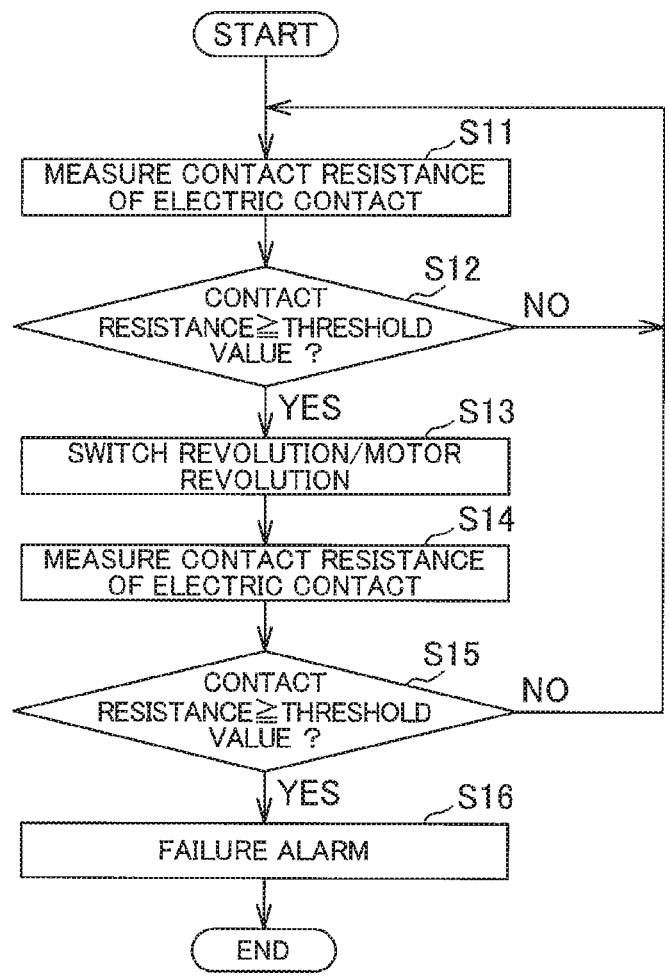
FIG. 3 is a flowchart illustrating a flow of a process in a deterioration regeneration method that is executed by the deterioration regeneration system shown in FIG. 1 and FIG. 2.

Next, the following will explain in more detail about the deterioration regeneration method performed by the deterioration regeneration system 1 shown in FIG. 1 and FIG. 2, with reference to FIG. 3.

FIG. 3 is a flowchart illustrating a flow of a process in a deterioration regeneration method that is executed by the deterioration regeneration system shown in FIG. 1 and FIG. 2.

A process of the deterioration regeneration method illustrated in the flowchart of FIG. 3 starts when a user starts an engine of the vehicle. When the process is started, firstly, the resistance measurement part 111 in the pre-and-post regeneration determination part 11 measures the contact resistance at this electric contact 16 based on the dark current flowing through the electric contact 16 (step S11). Then, the deterioration determination part 112 determines whether or not this measured contact resistance is equal to or greater than a predetermined threshold value (step S12). This determination by comparison of the contact resistance with the threshold value in step S12 corresponds to the determination of whether or not the deterioration regeneration process needs to be executed. If the contact resistance is equal to or greater than the threshold value, then it is determined that the deterioration regeneration process needs to be executed, and if the contact resistance is less than the threshold value, then it is determined that the deterioration regeneration process does not need to be executed.

In the deterioration regeneration method of this embodiment, the process up to step S12 correspond to a determination step of determining whether or not to execute the deterioration regeneration process that regenerates the connection performance of the electric contact that has been deteriorated due to an increase in the contact resistance over time, by reducing the contact resistance.

If the contact resistance is equal to or greater than the threshold value and it is determined that the deterioration regeneration process needs to be executed ("YES" in step S12), then the deterioration regeneration process is executed in the deterioration regeneration part 12 (step S13). As described above, the deterioration regeneration process in step S13 is executed by a switching instruction provided by the circuit switching part 121 to the switching circuit 17, and a regeneration current inputting instruction provided by the regeneration current instructing part 122 to the power supply part 15. This deterioration regeneration process continues for a predetermined time period. After the predetermined time period has elapsed, the regeneration current instructing part 122 provides the instruction to the power supply part 15 to stop the regeneration current, and the circuit switching part 121 provides the instruction to the switching circuit 17 to return the contact destination of the electric contact 16 from the blower fan motor 19 to the airbag device 18.

In the deterioration regeneration method of this embodiment, this process in step S13 corresponds to the deterioration regeneration step of executing the process of removing the foreign object present at the electric contact 16 by temporarily applying the second external action to the electric contact 16, the second external action being of the same kind as a first external action in the normal state and larger than this first external action.

After the completion of the deterioration regeneration process, the resistance measurement part 111 at the pre-and-post regeneration determination part 11 again measures the contact resistance of at the electric contact 16 (step S14). Then, the deterioration determination part 112 determines whether or not the measured contact resistance is equal to or greater than the predetermined threshold value (step S15). This process in step S15 determines whether or not the deteriorated state is still continuing at the electric contact 16 after the deterioration regeneration process.

If the deteriorated state is still continuing after the completion of the deterioration regeneration process ("YES" in step S15), then the failure alarm part 13 notifies that a failure is occurring at the electric contact 16 (step S16), and finishes the deterioration regeneration method of this embodiment.

In step S12 and step S15, if the contact resistance of the electric contact 16 is less than the threshold value ("NO" in step S12 and in step S15), then the process returns to step S11, and the subsequent process is repeated.

According to the deterioration regeneration system 1 and the deterioration regeneration method of the first embodiment explained above, it is capable of appropriately executing the deterioration regeneration process of removing the foreign object present at the electric contact 16 and causing an increase in the contact resistance by temporarily making the above-described regeneration current as the second external action to flow through the electric contact 16. Here, the second external action applied to the electric contact 16 in the deterioration regeneration process is a current load that is of the same kind as and larger than the first external action to be applied to the electric contact 16 during the operation of the airbag device 18 as a later-stage device. In this embodiment, such second external action as the large current is achieved by utilizing the blower fan motor 19 which is the existing mechanism provided around the electric contact 16 and temporarily increasing the value of the current that flows through the electric contact 16. Consequently, according to this embodiment, the deterioration in connection performance at the electric contact 16 can be addressed easily and simply without needing to perform a large-scaled disassembling inspection and such.

Herein, in the pre-and-post regeneration determination part 11 of this embodiment, the resistance measurement part 111 measures the contact resistance, and the deterioration determination part 112 determines whether or not the deterioration regeneration process needs to be executed by comparing the measured result with the predetermined threshold value. Consequently, by measuring the contact resistance of the electric contact 16, the deterioration regeneration process can be executed at an optimal timing.

Further, in this embodiment, the first external action is a current (namely, an operation current) that flows through the electric contact 16 during the operation of the airbag device 18, and the deterioration regeneration part 12 allows the regeneration current which is larger than that operation current to temporarily flow through the electric contact 16 as the second external action. In this embodiment, the foreign object is removed by the Joule heat or an impact produced when the above-described large regeneration current flows through the electric contact 16. Consequently, the insulating oxide coating and such formed over time on a metal part of the electric contact 16 can be removed effectively.

Further, in this embodiment, the pre-and-post regeneration determination part 11 determines whether or not the contact resistance is equal to or greater than the threshold value, after the completion of the deterioration regeneration process. Then, if it is determined that the contact resistance is equal to or greater than the threshold value at this time point, then the failure alarm part 13 notifies that there is a failure occurring at the electric contact 16. Consequently, the occurrence of the failure will be notified when the deterioration could not regenerated with the simple deterioration regeneration process, thus a user can accurately recognize the need for a full-scaled maintenance.

Next, the following will explained a second embodiment of the present invention.

Figure 4:
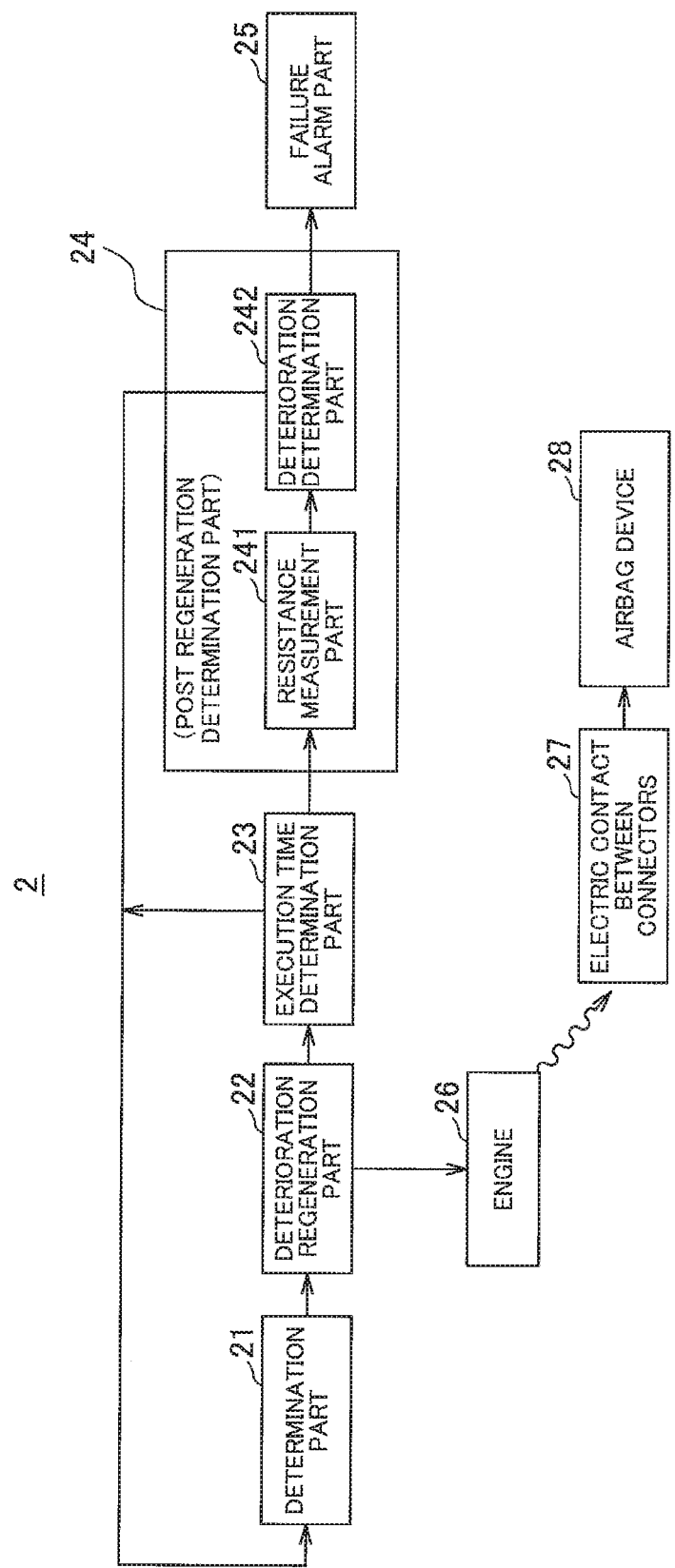
FIG. 4 is a block diagram illustrating a deterioration regeneration system according to a second embodiment of the present invention.

FIG. 4 is a block diagram illustrating a deterioration regeneration system according to a second embodiment of the present invention.

Similar to the deterioration regeneration system of the first embodiment described above, a deterioration regeneration system 2 of this embodiment is a system built in an ECU as a control device of a vehicle, and it is configured to regenerate the deterioration of an electric contact 27 between terminals of connectors connecting the ECU and an airbag device 28.

This deterioration regeneration system 2 includes a determination part 21, a deterioration regeneration part 22, an execution time determination part 23, a post-regeneration determination part 24 and a failure alarm part 25. The post-regeneration determination part 24 includes a resistance measurement part 241 and a deterioration determination part 242.

In this embodiment, the determination part 21 determines whether or not an execution timing for executing the deterioration regeneration process has come. Although not specified herein, this determination approach may include, for example, that the deterioration regeneration process is configured to be executed periodically with a predetermined interval of time, and that the determination part 21 determines whether or not a time elapsed from an execution of a last process has reached to the above-described interval of time. Alternatively, the approach may include, that the deterioration regeneration process is configured to be executed every time a total number of revolutions of an engine reaches to a predetermined number, and that the determination part 21 determines whether or not the total number of revolutions of the engine from the execution of the last process has reached to the predetermined number.

The deterioration regeneration part 22 is configured to execute the following deterioration regeneration process. Firstly, in this embodiment, a mechanical first external action to be applied to the electric contact 27 during the operation of the airbag device 28 as a later-stage device of the electric contact 27, is supposed to be a driving vibration transmitted from an engine 26 as a surrounding device (peripheral device) to the electric contact 27. The deterioration regeneration process in this embodiment is a process that temporarily increases the number of revolutions, i.e., a driving level, of the engine 26, thereby temporarily applying to the electric contact 27 the regeneration vibration that is larger than the driving vibration described above, as a second external action that is of the same kind as the first external action and larger than the first external action.

The execution time determination part 23 determines whether or not to execute a later-described determination process of checking the actual deteriorated state of the electric contact 27 every time the deterioration regeneration process is executed, regardless of the deterioration of the electric contact 27 as described above. Specifically, the execution time determination part 23 determines whether or not the execution timing for executing the next determination process has come based on the number of executions of the deterioration regeneration process from the last execution of the determination process by the later-described post-regeneration determination part 24.

After the deterioration regeneration process, the later-described post-regeneration determination part 24 determines whether or not the contact resistance of the electric contact 27 is equal to or greater than a threshold value. Firstly, the resistance measurement part 241 in the post-regeneration determination part 24 measures the contact resistance of the electric contact 27 based on a dark current. Then, the deterioration determination part 242 compares the measured result from the resistance measurement part 241 with a predetermined threshold value and thereby determines whether or not the deteriorated state is still continuing after the completion of the deterioration regeneration process.

The failure alarm part 25 notifies that there is a failure occurring at the electric contact 27 when the post-regeneration determination part 24 has determined that the contact resistance of the electric contact 27 is equal to or greater than the threshold value and the deteriorated state is still continuing after the completion of the deteriorated regeneration process. Although not specified herein, the form of the notification by the failure alarm part 25 may include an alarm sound, lighting of a LED, displaying of a message on a display screen and a navigation voice and such, as the case with the above-described first embodiment.

Figure 5:
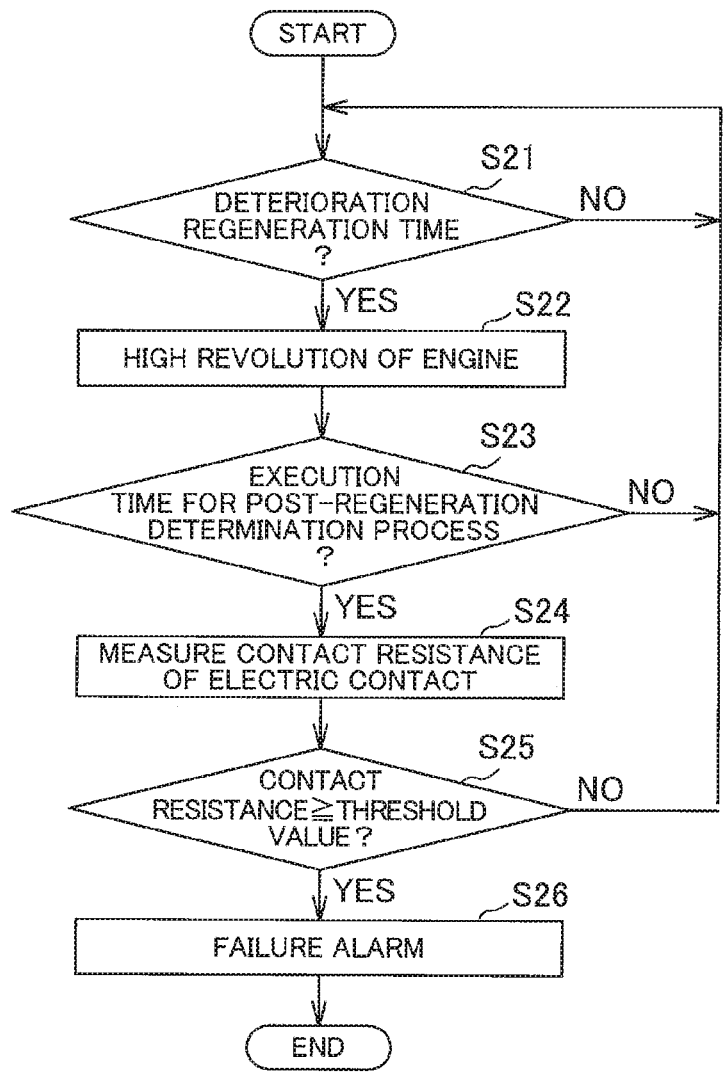
FIG. 5 is a flowchart illustrating a flow of a process in a deterioration regeneration method that is executed by the deterioration regeneration system shown in FIG. 4.

Next, the following will explain in more detail about the deterioration regeneration method performed by the deterioration regeneration system 2 shown in FIG. 4, with reference to FIG. 5.

FIG. 5 is a flowchart illustrating a flow of a process in the deterioration regeneration method that is executed by the deterioration regeneration system shown in FIG. 4.

A process of the deterioration regeneration method illustrated in the flowchart of FIG. 5 starts when a user starts an engine of the vehicle. When the process is started, firstly, the determination part 21 determines whether or not the execution timing for executing the deterioration regeneration process has come (step S21). In the deterioration regeneration method of this embodiment, this process in step S21 corresponds to a determination step of determining whether or not to execute the deterioration regeneration process.

When the execution timing for executing the deterioration regeneration process has come ("YES" in step S21), the deterioration regeneration part 22 temporarily increases the number of revolutions of the engine 26 and executes the deterioration regeneration process of applying the regeneration vibration to the electric contact 27 (step S22). In the deterioration regeneration method of this embodiment, this process in step S22 corresponds to the deterioration regeneration step of executing the process of removing the foreign object present at the electric contact 27 by temporarily applying the second external action to the electric contact 27, the second external action being of the same kind as the first external action in the normal state and larger than this first external action.

Subsequently, the execution time determination part 23 determines whether or not the execution timing for executing the next determination process has come based on the number of executions of the deterioration regeneration process from the last execution of the determination process of checking the actual deteriorated state of the electric contact 27 (step S23). When the execution timing has come ("YES" in step S23), the resistance measurement part 241 in the post-regeneration determination part 24 measures the contact resistance of the electric contact 27 based on the dark current (step S24). Then, the deterioration determination part 242 in the post-regeneration determination part 24 compares the measured result obtained from the resistance measurement part 241 with the predetermined threshold value and thereby determines whether or not the deteriorated state is still continuing after the completion of the deterioration regeneration process (step S25).

When the deteriorated state is still continuing after the completion of the deterioration regeneration process ("YES" in step S25), the failure alarm part 25 notifies that there is a failure occurring at the electric contact 27 (step S26), and finishes the deterioration regeneration method of this embodiment.

In step S21 and step S23, when the execution timing for executing the deterioration regeneration process or the post regeneration determining process has not come ("NO" in step S12 and step S15), the process returns to step S21, and the subsequent process is repeated. In addition, in step S25, when the contact resistance of the electric contact 27 is less than the predetermined threshold value ("NO" in step S25), then the process also returns to step S21 and the subsequent process is repeated.

As the case with the deterioration regeneration system 1 and the deterioration regeneration method of the first embodiment explained above, according to the deterioration regeneration system 2 and the deterioration regeneration method of the second embodiment explained above, the deterioration in the connection performance at the electric contact 27 can be addressed easily and simply.

In this embodiment, the determination part 21 determines whether or not the execution timing for executing the deterioration regeneration process has come. Consequently, the deterioration regeneration process is executed every time the execution timing has come regardless of the value of the contact resistance of the electric contact 27, i.e., regardless of whether or not the electric contact 27 is actually in the deteriorated state. This is preferable in view of so-called predictive maintenance.

Further, in this embodiment, the driving vibration is transmitted from the engine 26 to the electric contact 27, and the deterioration regeneration part 22 executes the deterioration regeneration process by temporarily increasing the number of revolutions of the engine 26 and thereby temporarily applies to the electric contact 27 the regeneration vibration that is larger than the driving vibration. According to this embodiment, by applying the large regeneration vibration as described above to the electric contact 27, a foreign object such as dust caught in the electric contact over time can be removed effectively.

Further, in this embodiment, the execution time determination part 23 determines whether or not the execution timing for executing the next determination process has come based on the number of executions of the deterioration regeneration process from the last execution of the determination process by the post-regeneration determination part 24 of determining the post-regeneration deteriorated state. After the completion of the deterioration regeneration process, the post-regeneration determination part 24 performs the determination process of determining the post-regeneration deteriorated state based on the determined result obtained from the execution time determination part 23. In this embodiment, the determination for the need for the notification of the failure occurrence is made based on the number of executions of the deterioration regeneration process that is repeatedly executed as the predictive maintenance regardless of the actual deterioration. Consequently, the processing load in the deterioration regeneration system 2 can be reduced.

The first and second embodiments described above are only representative embodiments of the present invention, and the present invention is not limited to these. That is, various modifications can be made without departing from the scope of the present invention, and of course, the modified versions are within the scope of the present invention as long as they include the configuration of the deterioration regeneration system and the deterioration regeneration method of the present invention.

For example, the embodiments described herein exemplary show, as one example of the deterioration regeneration system and the deterioration regeneration method of the present invention, the deterioration regeneration systems 1, 2 and the deterioration regeneration methods configured to regenerate the deterioration of the electric contact 16, 27 in the connector connecting the ECU and the airbag device 18, 28. However, the deterioration regeneration system and the deterioration regeneration method of the present invention are not limited to these and may include other forms as long as they are configured to regenerate the connection performance of the electric contact. For example, an electric contact of an object to be regenerated may be an electric contact in a component other than a connector such as a relay, or may be an electric contact in a connector connected to other devices such as a brake device, or the like.

Further, the embodiments described herein exemplary show, as one example of the deterioration regeneration system and the deterioration regeneration method of the present invention, the deterioration regeneration systems 1, 2 and the deterioration regeneration methods in which the process is started when a user starts the engine of the vehicle. However, the deterioration regeneration system and the deterioration regeneration method of the present invention are not limited to this, and a timing of the start of the process may be set arbitrarily.

Further, the first embodiment described above exemplary shows the process of applying the large regeneration current through the electric contact 16 to the blower fan motor 19 as one example of the inventive deterioration regeneration process for applying the regeneration current. However, the deterioration regeneration process for applying the regeneration current according to the present invention is not limited to this, and may include other forms such as the one in which the regeneration current is made to flow to a device other than the blower fan motor.

Further, the second embodiment described above exemplary shows the process of temporarily increasing the number of revolutions of the engine 26 as one example of the inventive deterioration regeneration process for applying the regeneration vibration to the electric contact. However, the deterioration regeneration process for applying the regeneration vibration to the electric contact according to the present invention is not limited to this, and may include other forms such as the one in which a device other than an engine is used as a vibration source of the regeneration vibration.

LIST OF REFERENCE SIGNS 1,2 deterioration regeneration system
11 pre-post regeneration determination part
12, 22 deterioration regeneration part
13, 25 failure alarm part
15 power supply part
16, 27 electric contact
17 switching circuit
18, 28 airbag device
19 blower fan motor
21 determination part
23 execution time determination part
24 post-regeneration determination part
26 engine
111, 241 resistance measurement part
112, 242 deterioration determination part
121 circuit switching part
122 regeneration current instructing part

What is claimed is:
1. A deterioration regeneration system comprising:
a determination part configured to determine whether or not to execute, with respect to an electric contact to which an electrical or mechanical first external action is applied during an operation of a later-stage device, a deterioration regeneration process for regenerating a connection performance that has been deteriorated due to an increase in a contact resistance of the electric contact; and a deterioration regeneration part configured to execute a process of removing a foreign object present at the electric contact by applying a second external action to the electric contact, as the deterioration regeneration process, according to the determined result from the determination part, the second external action being of the same kind as the first external action and larger than the first external action, wherein the first external action is an operation current flowing through the electric contact during an operation of the later-stage device, and wherein the deterioration regeneration part is configured to switch a connection destination of the electric contact from the later-stage device to another different later-stage device to make a regeneration current, as the second external action, that is larger than the operation current to flow through the electric contact.

2. The deterioration regeneration system as claimed in claim 1, wherein
the determination part includes a resistance measurement part and a deterioration determination part,
the resistance measurement part is configured to measure the contact resistance, and
the deterioration determination part is configured to compare the measured result from the resistance measurement part with a predetermined threshold value and thereby determine whether or not the deterioration regeneration process needs to be executed.

3. The deterioration regeneration system as claimed in claim 1, wherein
the determination part is configured to determine whether or not an execution timing for executing the deterioration regeneration process has come.

4. The deterioration regeneration system as claimed in claim 1, further comprising:
a post-regeneration determination part configured to execute a determination process to determine, after completion of the deterioration regeneration process, whether or not the contact resistance is equal to or greater than a threshold value; and
a failure alarm part configured to notify that a failure is occurring at the electric contact when the post-regeneration determination part has determined that the contact resistance is equal to or greater than the threshold value.

5. A deterioration regeneration method comprising:
a determination step of determining whether or not to execute, with respect to an electric contact to which an electrical or mechanical first external action is applied during an operation of a later-stage device, a deterioration regeneration process of regenerating a connection performance that has been deteriorated due to an increase in a contact resistance of the electric contact; and
a deterioration regeneration step of executing a process of removing a foreign object present at the electric contact by applying a second external action to the electric contact, as the deterioration regeneration process, according to the determined result obtained from the determination step, the second external action being of the same kind as the first external action and larger than the first external action,
wherein the first external action is an operation current flowing through the electric contact during an operation of the later-stage device, and
wherein the deterioration regeneration step includes switching a connection destination of the electric contact from the later-stage device to another different later-stage device to make a regeneration current, as the second external action, that is larger than the operation current to flow through the electric contact.

6. The deterioration regeneration system as claimed in claim 2, further comprising:
a post-regeneration determination part configured to execute a determination process to determine, after completion of the deterioration regeneration process, whether or not the contact resistance is equal to or greater than a threshold value; and
a failure alarm part configured to notify that a failure is occurring at the electric contact when the post-regeneration determination part has determined that the contact resistance is equal to or greater than the threshold value.

7. The deterioration regeneration system as claimed in claim 3, further comprising:
a post-regeneration determination part configured to execute a determination process to determine, after completion of the deterioration regeneration process, whether or not the contact resistance is equal to or greater than a threshold value; and
a failure alarm part configured to notify that a failure is occurring at the electric contact when the post-regeneration determination part has determined that the contact resistance is equal to or greater than the threshold value.

* * * * *